United States Patent Office 3,780,121
Patented Dec. 18, 1973

3,780,121
DISPROPORTIONATION OF ALKYLAROMATICS
Robert M. Suggitt, Wappingers Falls, John T. Brandenburg, Hopewell Junction, and John M. Crone, Jr., Fishkill, N.Y., assignors to Texaco Inc., New York, N.Y.
No Drawing. Filed Sept. 2, 1971, Ser. No. 177,483
Int. Cl. C07c 3/62
U.S. Cl. 260—672 T                                    15 Claims

ABSTRACT OF THE DISCLOSURE

Alkylaromatic hydrocarbons are disproportionated in the presence of a composite catalyst composed of a hydrogen mordenite and a Group I-B metal. The composite catalyst may additionally contain a Group VI-B metal.

BACKGROUND OF THE INVENTION

This invention relates to the catalytic conversion of alkylaromatic hydrocarbons. In a particularly desirable embodiment this invention is directed to the catalytic disproportionation of methylated aromatics such as toluene, xylene and trimethylbenzenes.

The catalytic disproportionation of methylbenzenes has heretofore been considered employing a variety of catalysts. Catalysts proposed by the art include hydrogen mordenites containing a sulfided Group VIII metal and particularly decationized or hydrogen mordenites having high silica to alumina ratios as disclosed in U.S. Pat. 3,476,821, asigned to Texaco Inc. The process and catalytic compositions disclosed in this reference provides numerous advantages including the ability to selectively convert toluene to benzene and xylene with virtually no naphthene formation. However, the process requires that a sulfide compound such as hydrogen sulfide be present so as to retain good selectivity for the catalytic conversion. In the absence of a sulfur compound large portions of the feed are converted to naphthenes and cracked products.

It is, therefore, an object of this invention to provide a process for the conversion of alkylaromatic hydrocarbons which does not require the presence of a sulfur compound.

Another object of this invention is to provide a process for the disproportionation of alkylaromatics by employing a novel and highly selective composite as catalyst therefor.

Other objects and advantages will become apparent from a reading of the following description and examples.

SUMMARY OF THE INVENTION

Broadly, this invention contemplates a process for the catalytic conversion of alkylaromatic hydrocarbons which comprises contacting said hydrocarbons under disproportionation conditions with a composite catalyst comprising hydrogen mordenite having a silica to alumina mole ratio of greater than about 10 to 1 and a Group I-B metal. The composite catalyst may additionally comprise a Group VI-B metal. In another embodiment, the catalyst further comprises as a component thereof alumina in amounts ranging from 10 to 50 weight percent of the composite material. It has been found that the disproportionation of alkylaromatics in the presence of the aforementioned catalyst is significantly improved and that the catalytic composition employed in the process possesses superior selectivity in the disproportionation of alkylbenzenes.

The hydrocarbons converted by the instant process includes alkylaromatics by which we mean alkylbenzenes and particularly alkylbenzenes having from 1 to 5 methyl groups. The feedstock can be any one of the methylated aromatic hydrocarbons or mixtures thereof. Specific alkylbenzenes include toluene, ortho-, meta- and para-xylene, trimethylbenzenes such as mesitylene, pseudocumene and hemimellitene, tetramethylbenzenes including durene, iso-durene and prehnitene, and pentamethylbenzene along with mixtures of the above. With regard to the conversion of the hydrocarbon, the feedstock containing one or more alkylaromatic hydrocarbons is contacted with the aforementioned catalyst at a temperature effective to disproportionate at least some of the alkylaromatic hydrocarbons to aromatic products having a greater number and a lesser number of carbon atoms.

In accordance with our invention, the composite catalyst employed to convert the aforementioned hydrocarbons is prepared by initially providing a hydrogen mordenite having a silica to alumina mole ratio above about 10:1 but less than about 100:1, particularly between about 12:1 and 80:1. In a highly preferred embodiment the hydrogen mordenite possesses a silica to alumina mole ratio of about 25:1 to 50:1. Hydrogen mordenites contemplated above as a component of the composite catalyst can be prepared from natural or commercially available synthetic sodium mordenites having silica to alumina ratios of about 10:1.

The sodium form of mordenite is not effective as a component of the disproportionation catalyst employed herein. However, it may be converted to hydrogen mordenite by ion exchange of the sodium in the mordenite with ammonium ions followed by heating or calcining to drive off ammonia. Alternatively, decationized or hydrogen mordenite can be provided by acid treatment of the sodium form. The hydrogen mordenite (10:1 $SiO_2/Al_2O_3$) whether prepared as above or available from commercial sources is thereafter subjected to severe acid leaching so as to substantially increase the silica to alumina mole ratio of the hydrogen mordenite to above about 10:1. However, the acid leaching operation must not destroy the mordenite's crystalline structure. Moreover, little improvement is realized in our process where the silica to alumina ratio of the mordenite is greater than about 100:1. Consequently, as a practical limit the acid leaching should be severe enough to produce a mordenite having a silica to alumina ratio between about 12:1 and 80:1, preferably from about 25:1 to 50:1. To acid leach the hydrogen mordenite we employ a mineral acid, for example hydrochloric or sulfuric acid, so as to selectively remove aluminum without destroying the crystalline structure of the mordenite. Acid strengths of 1 to 8 N are appropriate and the leaching temperatures can range from room temperature up to the boiling point of the acid solution. Following the leaching operation, the mordenite is water washed free of acid anions and is in the form of small soft aggregates of a particle size generally in the range of about 0.5 to 10 microns.

The acid leached hydrogen modenite is now in a suitable form for impregnation with an aqueous solution of a Group I-B metal salt. Group VI-B metals may also be associated with the mordenite and the Group I-B impregnating solution may additionally contain soluble salts of members of Group VI-B or separate and subsequent impregnation may be undertaken with the Group VI-B component. Group I-B metals including copper and silver are introduced in an amount sufficient to provide the final composite catalyst with a Group I-B metal content of from about 1 to 20 weight percent. Preferably, we employ copper or silver in an amount of from 2 to 15 weight percent. The Group VI-B metal, including tungsten, molybdenum and chromium, can also be associated with the hydrogen mordenite in amount ranging from about 3.0 to 15.0 weight percent based on the composite catalyst. After employing impregnation techniques well known to the art, the impregnated high silica hydrogen mordenite is beneficially heated to a temperature of from 250 to 350° F. so as to partially dry the impregnated particulates.

In a further embodiment of this invention, the metal impregnated high silica hydrogen mordenite is admixed with hydrated alumina such that the ultimate composite catalyst contains alumina as a component thereof in amounts ranging from about 10 to 50 weight percent and preferably from 15 to 30 weight percent. In practice, the metal impregnated mordenite is introduced to a freshly prepared precipitate of hydrated alumina, such as alpha or beta alumina hydrate, and the components are mixed for a time sufficient to give a uniform dispersion of the mordenite. The mixing is conveniently carried out in water slurry and in a colloid mill where any impregnated mordenite aggregates, some of which may be of a size of 20 to 50 microns, are broken down to particles in general having average diameters of about 0.5 to 5 microns. Preferably, we have found that impregnating the hydrogen mordenite powder provides a more uniform distribution of the metal component than can be obtained by impregnation of a mordenite-alumina composite. The composite resulting from the admixing operation after separation of water by decantation and partial drying is formed into the desired shape contemplated for ultimate use. Illustratively, the particles can be ground to provide a finely divided catalytic mass as by mulling or beads may be formed but we prefer that the composite be pelleted.

Subsequent to shaping, the composite is slowly dried at ambient temperature for a period of 8 to 16 hours and at 130 to 140° F. for a period of 8 to 16 hours followed by heating to 300–700° F. for about 8 to 16 hours and thereafter calcined in a stream of dry gas at temperatures of from about 700 to 1100° F. for a period of at least 2 hours. Calcination is preferably accomplished at temperatures of from 850 to 1000° F. Calcining of the composite converts the hydrated alumina to eta or gamma alumina depending upon whether the initial hydrate was alpha or beta. At the completion of the calcination step, the converted alumina is transformed into a strong binder. Pellets prepared by this technique possess crush strengths of from 20 to 40 pounds.

The catalytic conversion of alkylaromatic hydrocarbons in the presence of the aforementioned catalyst is conducted in the presence of hydrogen. Hydrogen functions to prolong the useful on stream life of the catalyst by maintaining the catalyst surface clean by hydrogenating coke precursors while simultaneously avoiding hydrogenation of the aromatic ring. In general the disproportionation conditions employed for catalytically converting the alkylaromatic hydrocarbons as practiced by our invention in the presence of the aforementioned catalyst includes space velocities in the range of about 0.1 to 10 liquid volumes per hour per volume of catalyst, preferably 0.5 to 4 LHSV; temperatures in the range of about 400 to 750° F., preferably 450 to 650° F.; pressures within the range of 100 to 2000 p.s.i.g., preferably in the range of 800 to 1200 p.s.i.g., and hydrogen concentrations of 100 to 10,000 s.c.f./bbl. of feed, preferably 5000 to 10,000 s.c.f./bbl. The reaction is suitably carried out over a fixed bed of catalyst with feed-stock passing downwardly through the catalyst bed.

As the catalyst ages its activity slowly diminishes. The catalyst may be maintained at or periodically brought back to approximately its initial level of activity by increasing the operating temperature. Ultimately, regeneration of the catalyst by oxidation can be employed involving a controlled burning of the contaminants from the surface of the catalyst structure with air or a mixture of inert gases with air or oxygen. Regeneration may also be effected by treatment of the catalyst with hydrogen at temperatures generally above the usual conversion reaction temperature.

The beneficial effects derived from the aforementioned invention are manifold. A primary advantage is that the catalyst functions selectively in the absence of, for example, hydrogen sulfide. The process employing the metal component in the sulfided state necessitates product clean up as by $H_2S$ stripping which is avoided by the instant invention. When alumina is present as a component, the catalyst posesses significantly improved mechanical strength. The improved mechanical strength is attributed to the presence in the composite of eta or gamma alumina. Further, the purities of the fractions formed are so high that individual components can be readily recovered free of the ethyl isomeric forms. In particular, mesitylene essentially free of orthoethyltoluene can be recovered from the xylene disproportionation product by means of distillation alone. Operating in accordance wth the conditions and catalyst described above, it has been found that the methylated aromatic feedstock is selectively converted such that the fractions obtained are substantially free of ethylated aromatics, $C_6$ and $C_7$ naphthenes and light hydrocracked products boiling below 150° F. For example, conversion of toluene to benzene and isomeric xylenes yields a product substantially free of ethylbenzene and as such provides an attractive route for the preparation and recovery of paraxylene from $C_8$ aromatic fractions. Likewise, disproportionation of orthoxylene results in a product low in alkylated aromatic isomer content such that the concentration of trimethylbenzenes is proportionately high and recovery of mesitylene, in particular, by distillation is facilitated by the relative absence of ethyltoluene such as orthoethyltoluene. Other advantages include the absence of ethylbenzene in the xylene fraction enabling recovery of paraxylene by low temperature crystallization more efficiently. The term catalytic conversion as used herein encompasses not only disproportionation but also isomerization of alkylbenzenes under the conversion conditions recited above.

The disproportionated and isomerized aromatic hydrocarbons provided by our process have utility as solvents or as raw materials for the manufacture of numerous industrial chemicals and products. For example orthoxylene finds application as a raw material in the production of phthalic anhydride and phthalate plasticizers while metaxylene is imoprtant to the production of isophthalic acid. Paraxylene is used in the production of terephthalic acid or terephthalate esters which fined particular utility in the manufacture of polyester fiber. Benzene produced from our process is useful as a oslvent and as a raw material for the synthesis of styrene, phenol, nitrobenzene and cyclohexane which in turn can be used to produce such materials as synthetic rubber, detergents, and insecticides. Other aromatics such as the trimethylbenzenes, pseudocumene and mesitylene are employed respectively to prepare trimellitic anhydride useful in preparing non-volatile plasticizers and trimesic acid to make cross-linked polymers. Tetramethylbenzenes such as durene are employed in making pyromellitic dianhydride used in the preparation of higher temperature resistant polymers.

In order to more fully illustrate the nature of our invention and manner of practicing the same the following examples are presented.

EXAMPLE I 1933 grams of a commercially available hydrogen mordenite powder having a $SiO_2/Al_2O_3$ mole ratio of 13:1 was acid leached with 6 liters of 3 N HCl for 24 hours at a temperature of 130° F. and repeated for a total of 5 separate acid leachings. The acid was decanted and the solids washed 3 times with 6 liters of hot water and 3 times with 6 liters of cold water which provided a product comprising 0.34 weight percent $Na_2O$, 8.1 weight percent $Al_2O_3$, 87.0 weight percent $SiO_2$ and a $SiO_2/Al_2O_3$ mole ratio of 18.1:1. The acid leached product was washed free of chloride ion, dried at 300° F. and calcined to a temperature of 1000° F.

4.02 grams of the acid leached mordenite was impregnated with 4.0 cc. of a silver nitrate solution containing 0.126 gram of silver nitrate and the impregnated powder was dried for 1 hour at a temperature of 900° F. The dried material contained 2 weight percent silver.

A series of runs were conducted using a toluene feedstock which was introduced to disproportionation reactors respectively containing 1.00 gm. of the dried acid leach mordenite labelled catalyst A and 1.00 gm. of silver impregnated acid leached mordenite as prepared above labelled catalyst B under the processing conditions summarized in Table I.

TABLE I

| Catalyst | A | A | B |
|---|---|---|---|
| Temperature, °F | 550 | 550 | 550 |
| LHSV | 2.0 | 2.0 | 2.0 |
| Pressure, p.s.i.g | 200 | 200 | 200 |
| $H_2$/hydrocarbon mole ratio | 3/1 | 3/1 | 3/1 |
| Time, hrs | 1 | 2 | 2 |
| Product analysis, wt. percent: | | | |
| Benzene | 5.6 | 3.4 | 7.3 |
| Toluene | 85 | 91 | 81 |
| Paraxylene | 2.5 | 1.6 | 3.2 |
| Metaxylene | 5.4 | 3.2 | 6.5 |
| Orthoxylene | 1.9 | 0.9 | 2.5 |

It will be seen from Table I above that the disproportionation activity of the silver promoted acid leached mordenite is higher after two hours of operation than with the non-promoted catalyst. In addition, the non-promoted catalyst rapidly lost activity with time on stream.

EXAMPLE II 2000 grams of a commercially available sodium mordenite powder comprising 6.86 weight percent $Na_2O$, 10.2 weight percent $Al_2O_3$, 68.2 weight percent $SiO_2$ and a $SiO_2/Al_2O_3$ mole ratio of 11.4:1 was acid leached with 4 liters of 6 N HCl for 24 hours at a temperature of 130° F. The acid was decanted and the solids washed 3 times with 6 liters of hot water and 3 times with 6 liters of cold water which provided a product comprising 0.93 weight percent $Na_2O$, 5.75 weight percent $Al_2O_3$, 88.1 weight percent $SiO_2$ and a $SiO_2/Al_2O_3$ mole ratio of 26:1. The acid leaching was again repeated, the product was washed free of chloride ion, dried at 300° F. and calcined to a temperature of 1000° F. The final acid leached mordenite consisted of 0.24 weight percent $Na_2O$, 4.0 weight percent $Al_2O_3$, 91.8 weight percent $SiO_2$ and a $SiO_2/Al_2O_3$ mole ratio of 39:1.

386 grams of the acid leached mordenite was impregnated with 100 cc. of a copper nitrate solution containing 63 grams of copper nitrate and 100 cc. of a chromium trioxide solution containing 26 grams of chromium trioxide and the impregnated powder was dried for 16 hours at a temperature of 70° F.

610 grams of the impregnated acid leached mordenite was mixed with 1800 grams of hydrated alumina gel and passed through a mill to effect homogeneous mixing. After partially drying the mixture at a temperature of 130° F. for 24 hours, and crushing and sieving through a 40 mesh screen and extruding into 1/16 inch pellets, the pellets were dried at 70° F. for sixteen hours, at 130° F. for eight hours, at 300° F. for sixteenth hours, thereafter for periods of one hour at increasing temperatures of 500 to 900° F. in increments of 100° F. and finally at 1000° F. for two hours. The recovered pellets consisted of 5 weight percent $CuO \cdot CuCr_2O_4$, 15 weight percent gamma alumina and the remainder hydrogen mordenite having a

mole ratio of 40:1. The pellets had an average crush strength of 31 pounds as determined by selecting at random 20 pellets and crushing them using a Chatillon Crush Strength Tester with a 50 pound scale.

This catalyst was evaluated for toluene disproportionation at a liquid hourly space velocity 1.0, a temperature of 550° F., a pressure of 800 p.s.i.g. and an on stream time of 8 hours. The recovered product comprised 4.25 weight percent benzene, 5.46 weight percent xylenes and 0.20 weight percent trimethylbenzenes with the remainder consisting substantially of unconverted toluene.

The catalyst was further evaluated for the disproportionation of orthoxylene at a liquid hourly space velocity of 1 and a hydrogen pressure of 800 p.s.i.g. with a hydrogen flow of 4800 s.c.f./bbl. The feedstock consisted of 99.94 weight percent orthoxylene and 0.06 weight percent metaxylene. Table II summarizes the results after conversion at temperatures ranging from 550 to 625° F.

TABLE II

| Temperature, °F | 550 | 580 | 600 | 625 |
|---|---|---|---|---|
| Product analysis, wt. percent: | | | | |
| Cracked below $C_6$ | 0.00 | 0.01 | 0.01 | 0.02 |
| $C_6$, $C_7$, $C_8$ naphthenes | 0.06 | 0.06 | 0.06 | 0.07 |
| Benzene | 0.61 | 0.77 | 1.04 | 1.33 |
| Toluene | 8.19 | 11.03 | 14.17 | 16.18 |
| Ethylbenzene | 0.00 | 0.00 | 0.00 | 0.002 |
| Paraxylene | 13.86 | 15.59 | 15.08 | 14.11 |
| Metaxylene | 41.29 | 39.90 | 36.13 | 33.13 |
| Orthoxylene | 26.18 | 18.33 | 14.62 | 13.09 |
| Ethyltoluenes | 0.00 | 0.00 | 0.02 | 0.05 |
| Trimethylbenzenes | 9.42 | 13.48 | 17.46 | 20.06 |
| Ethylxylenes | 0.00 | 0.01 | 0.04 | 0.08 |
| Tetramethylbenzenes | 0.39 | 0.82 | 1.37 | 1.88 |

From Table II it will be appreciated that a major reaction simultaneously occurring along with disproportionation in the 550 to 580° F. region is isomerization of orthoxylene into the para and meta isomers. Substantial yields of the para and meta isomers are formed with no detectable amount of ethylbenzene generated. The absence of ethylbenzene facilitates the separation in good yield of the paraxylene from the $C_8$ aromatic fraction.

At the 600 to 625° F. region, the product contains substantial amounts of trimethylbenzenes produced via the disproportionation reaction along with para and metaxylenes. The $C_9$ aromatic fraction formed contains mesitylene along with insignificant amounts of the three ethyltoluenes. This $C_9$ cut is an attractive material for recovering mesitylene in pure form through fractionation.

It will be recognized that the aforementioned catalysts described and illustrated above additionally are effective to isomerize alkylaromatic hydrocarbons in the course of the disproportionation process. Thus, as has been shown, orthoxylene is converted into the meta and para isomers. Similarly, trimethylbenzenes such as pseudocumene are not only disproportionated to aromatics having greater and lesser carbon atoms but can also be isomerized into mesitylene and hemimellitene virtually free of the orthoethyltoluene impurity.

We claim:

1. A process for the catalytic conversion of alkylaromatic hydrocarbons which comprises contacting said hydrocarbons under disproportionation conditions with a composite catalyst comprising hydrogen mordenite having a silica to alumina mole ratio of between about 12:1 to 80:1 and a Group I-B metal.

2. A process according to claim 1 wherein said hydrocarbon comprises alkylbenzenes having from 1 to 5 methyl groups.

3. A process according to claim 1 wherein said hydrocarbon is toluene.

4. A process according to claim 1 wherein said hydrocarbon is xylene.

5. A process according to claim 1 wherein said hydrocarbon is trimethylbenzene.

6. A process according to claim 1 wherein said Group I-B metal comprises from about 1 to 20 weight percent of said composite catalyst.

7. A process according to claim 1 wherein said Group I-B metal is selected from the group consisting of copper and silver.

8. A process according to claim 1 wherein alumina is associated with said composite catalyst and comprises from about 10 to 50 weight percent thereof.

9. A process according to claim 8 wherein said alumina comprises from 15 to 30 weight percent of said composite catalyst.

10. A process according to claim 1 wherein a Group VI-B metal is associated with said composite catalyst and comprises from about 3.0 to 15.0 weight percent thereof.

11. A process according to claim 1 wherein the silica to alumina mole ratio is from about 25:1 to 50:1.

12. A process according to claim 1 wherein said disproportionation conditions comprise a temperature in the range of 400 to 750° F., a space velocity in the range of 0.1 to 10 liquid volumes per volume of catalyst per hour and a pressure in the range of 100 to 2000 p.s.i.g.

13. A process according to claim 1 wherein said process is conducted in the presence of hydrogen.

14. A process according to claim 1 wherein toluene is converted to xylene.

15. A process according to claim 1 wherein orthoxylene is converted to trimethylbenzenes, metaxylene and paraxylene.

References Cited

UNITED STATES PATENTS

| 3,281,483 | 10/1966 | Benesi et al. | 260—672 T |
| 3,442,795 | 5/1969 | Kerr et al. | 260—672 T |
| 3,699,181 | 10/1972 | Kmecak et al. | 260—672 T |

CURTIS R. DAVIS, Primary Examiner

U.S. Cl. X.R.

260—668 A